March 4, 1930.  J. F. HILL  1,749,074
HARROW
Filed March 8, 1928  2 Sheets-Sheet 2
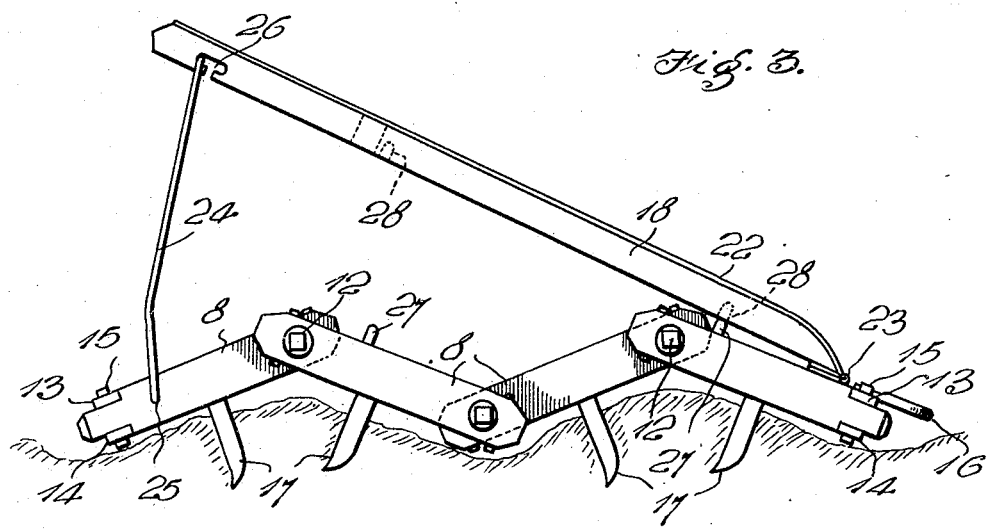
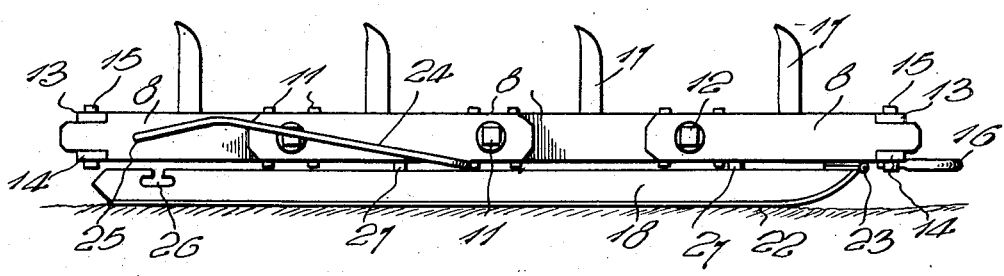
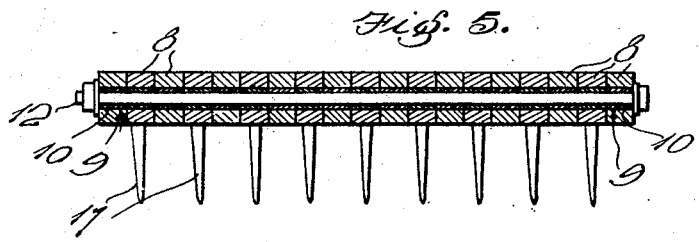
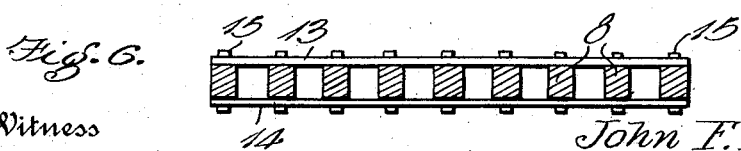
Witness
H. Woodard
Inventor
John F. Hill
By H. R. Wilson & Co.
Attorneys Patented Mar. 4, 1930

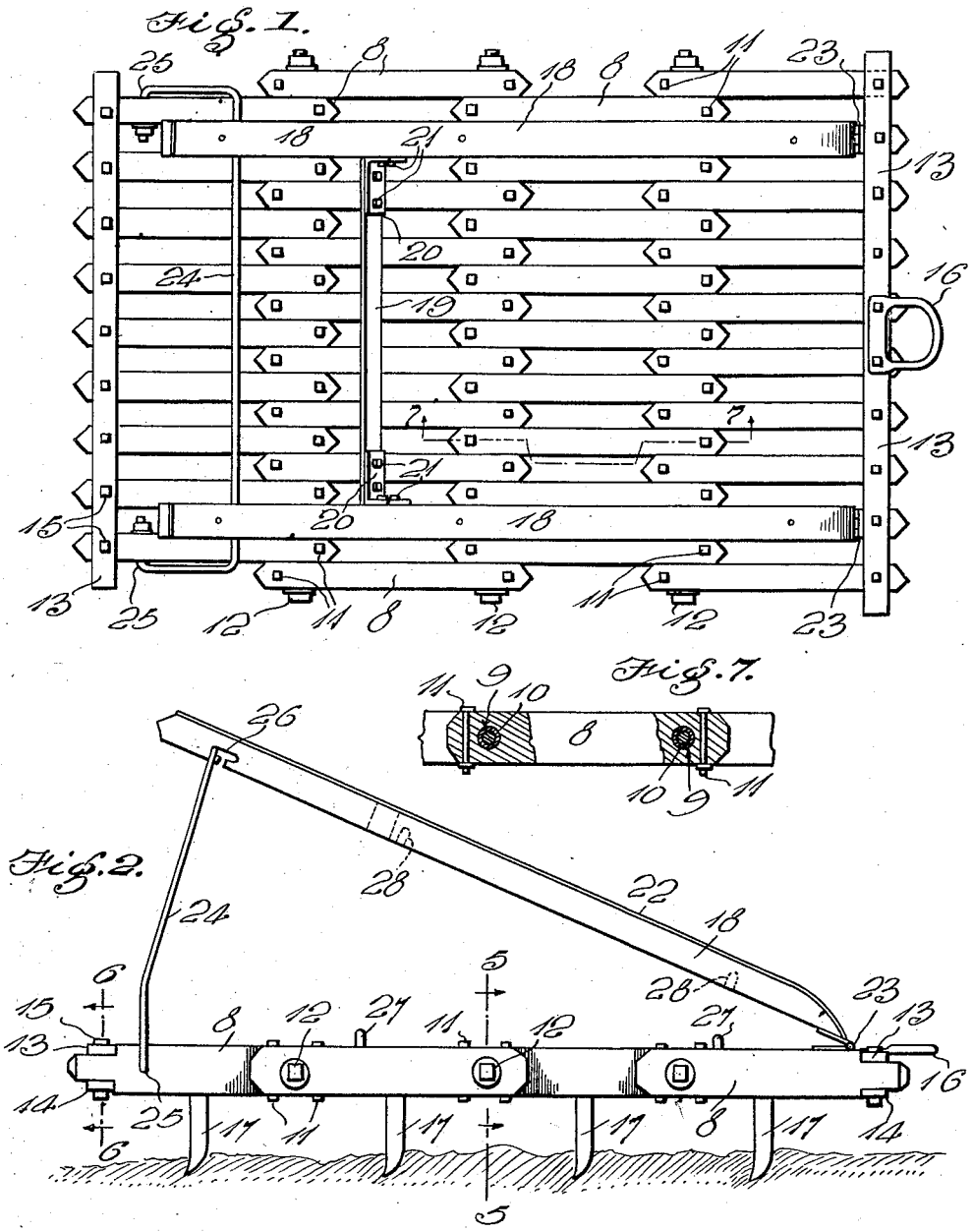

1,749,074

UNITED STATES PATENT OFFICE

JOHN FREDERICK HILL, OF CLATSKANIE, OREGON

HARROW

Application filed March 8, 1928. Serial No. 260,069.

The invention relates to improvements in harrows of the general type provided at their upper sides with runners for use in transporting the harrows when inverted. Harrows of this general type have long been in use, but up to the time of my invention, I am not aware that any construction of analogous nature has been provided, in which the harrow is flexible, as heretofore there has been no practical solution of a manner of connecting the runners with a flexible harrow in such manner that they would not interfere with the necessary flexibility of such harrow, in use. It is therefore the object of my invention to provide a new and improved construction and arrangement of parts whereby a harrow of flexible nature may be provided with runners, novel provision being made whereby said runners will not interfere with the flexing of the implement.

With the foregoing in view, the invention resides in the novel subject matter hereinafter described and claimed, description being accomplished by reference to the accompanying drawings.

Fig. 1 is a top plan view.

Fig. 2 is a side elevation showing the relation of parts when the flexible harrow is disposed in a single plane.

Fig. 3 is a view similar to Fig. 2 but illustrating the manner in which the harrow may flex.

Fig. 4 is a side elevation showing the harrow conditioned to be moved from one place to another.

Figs. 5 and 6 are transverse sectional views on the correspondingly numbered lines of Fig. 2.

Fig. 7 is a longitudinal sectional view partly in elevation, on line 7—7 of Fig. 1.

The flexible harrow herein disclosed, is constructed as described below but may be of other desired construction.

A plurality of short longitudinally disposed wooden bars 8 are arranged in overlapping relation and have openings 9 formed in their ends and lined with appropriate metal bushings 10, bolts 11 being passed through said ends to prevent splitting. Transverse bolts 12 pass through the bushings 10 and connect the bars 8 with each other in such manner that said bars may relatively swing upwardly and downwardly, as will be clear from Fig. 3. The ends of the bars 8 at the ends of the harrow, are secured together by upper and lower bars 13—14, secured thereto by bolts 15, and an appropriate hitch 16 may be secured to the foremost of said bars 13.

The bars 8 carry harrow teeth 17 which are preferably rather flat and sharp-edged and have their lower ends curved rearwardly to some extent, it having been found that this construction is most advantageous.

Extending longitudinally over the flexible harrow are two runners 18 preferably connected by a transverse bar 19, brackets 20 and bolts 21. These runners may well be formed of wood with appropriate metal shoes 22. At their front ends, the runners 18 are hinged at 23 to the front end portion of the harrow, so that they may swing upwardly to the inclined position shown in Figs. 2 and 3, when the harrow is in use, in which position they will not interfere with proper flexibility of said harrow. Means is provided for holding the runners 18 in their inclined positions, and the means herein disclosed, is preferable. 24 denotes a U-shaped metal rod whose ends are pivoted at 25 to the rear portion of the harrow, the intermediate portion of said rod being adapted to support the runners 18 when the latter and said rod are swung upwardly as shown in Figs. 2 and 3. The runners are provided with appropriate means, such as the T-shaped slots 26, to receive the rod and hold it in operative position.

The harrow is preferably provided with dowel pins 27 and the runners with sockets 28 to receive said pins when the runners are swung downwardly against the harrow. The entire structure may then be inverted as shown in Fig. 4, and the runners 18 used as supporting means for the structure while it is being drawn from one place to another. When the harrow is to be used, the runners 18 and the rod 24 are swung upwardly and engaged with each other as shown in Figs. 2 and 3, and with the parts in these positions, unhampered flexibility of the harrow may take place to advantageously work ground which cannot be properly worked with a rigid harrow.

By preference, the runners 18 are spaced apart a distance corresponding to that between two rows of corn. Thus, with the harrow in the position of Fig. 4, it may be drawn across a prepared field so that the runners mark the lines upon which rows of corn are to be planted. The field may if desired, be marked with lines at right angles to each other, and the corn planted at the points of intersection.

As excellent results are obtainable from the details disclosed, they are preferably followed. However, within the scope of the invention as claimed, variations may be made.

I claim:—

1. A flexible harrow, runners at the upper side of said harrow for use in transporting the latter when inverted, and means for supporting said runners above the harrow when the latter is in use, whereby said runners will not interfere with flexibility of the harrow.

2. A flexible harrow, runners at the upper side of said harrow for use in transporting the latter when inverted, means hinging said runners to one end of the harrow and permitting upward swinging of said runners, and means for holding said runners in upwardly swung position when the harrow is in use, whereby said runners will not interfere with flexibility of the harrow.

3. A flexible harrow, runners at the upper side of said harrow for use in transporting the latter when inverted, means hinging said runners to one end of the harrow and permitting upward swinging of said runners, and means pivoted to said harrow and upwardly swingable therefrom for propping said runners in upwardly swung position when the harrow is in use, said runners having means for engagement with said propping means to hold the latter in operative position.

4. A flexible harrow, runners at the upper side of said harrow for use in transporting the latter when inverted, means hinging said runners at one end to said harrow and permitting upward swinging of said runners, and a U-shaped rod whose ends are pivoted to the harrow on axes parallel with the axes of said hinge means, the intermediate portion of said rod being adapted to support the runners in upwardly swung position when said rod is upwardly swung, said runners having means to engage said rod and hold the same in operative position.

In testimony whereof I have hereunto affixed my signature.

JOHN FREDERICK HILL.